United States Patent [19]

Matsuura et al.

[11] Patent Number: 4,603,285
[45] Date of Patent: Jul. 29, 1986

[54] TRACER CONTROL METHOD

[75] Inventors: Hitoshi Matsuura; Etsuo Yamazaki; Hiroshi Sakurai, all of Tokyo, Japan

[73] Assignee: Fanuc Ltd., Minamitsuru, Japan

[21] Appl. No.: 634,107

[22] PCT Filed: Dec. 7, 1983

[86] PCT No.: PCT/JP83/00431
§ 371 Date: Jul. 19, 1984
§ 102(e) Date: Jul. 19, 1984

[87] PCT Pub. No.: WO84/02299
PCT Pub. Date: Jun. 21, 1984

[30] Foreign Application Priority Data

Dec. 7, 1982 [JP] Japan .................................. 57-214400

[51] Int. Cl.$^4$ ............................................. G05B 19/36
[52] U.S. Cl. .................................... 318/578; 318/571; 364/474
[58] Field of Search ............... 318/571, 578, 567, 570; 364/474

[56] References Cited

U.S. PATENT DOCUMENTS

| 4,224,670 | 9/1980 | Yamazaki | 318/571 X |
| 4,355,362 | 10/1982 | Imazeki et al. | 318/571 |
| 4,370,722 | 1/1983 | Imazeki et al. | 318/571 X |
| 4,386,408 | 5/1983 | Imazeki et al. | 318/578 X |
| 4,412,295 | 10/1983 | Imazeki et al. | 318/571 X |
| 4,456,962 | 6/1984 | Imazeki et al. | 318/578 X |

Primary Examiner—B. Dobeck
Attorney, Agent, or Firm—Staas & Halsey

[57] ABSTRACT

A plurality of path patterns ($MCR_1$–$MCR_3$), in which at least data specifying tracing areas serve as variables, are registered in a memory (102) beforehand, tracer machining data including call instructions ($MCC_1$–$MCC_3$) for calling a predetermined path pattern, as well as actual numbers, are stored in a memory (101) in advance, and tracer machining data are read block-by-block to perform tracer control. When a path pattern call instruction is read, the predetermined path pattern is read out of the memory (102), the variables are replaced by actual numbers to obtain a tracing area, and tracing is performed in the tracing area on the basis of the read path pattern.

5 Claims, 19 Drawing Figures

TRACER CONTROL METHOD

BACKGROUND OF THE INVENTION

This invention relates to a tracer control method and, more particularly, to a tracer control method whereby any tracing pattern can be simply created and tracer machining performed in accordance with the tracing pattern.

A tracer apparatus operates by causing a tracer head to trace a model, calculating velocity commands along various axes by means of a tracer arithmetic circuit using a deflection value sensed by the tracer head. The tracer apparatus controls driving motors for the corresponding axes on the basis of the velocity commands along these axes to transport a tool relative to a workpiece, and repeats these operations to machine the workpiece into a shape identical with that of the model. The tracing methods (tracing patterns) that are available with the foregoing tracer apparatus are (a) manual tracing, (b) two-way scan tracing, (c) one-way scan tracing, (d) 360° contour tracing, (e) partial contour tracing and (f) three-dimensional tracing. The conventional practice is to specify one of the tracing methods (a) through (f), enter tracer machining conditions, such as tracing velocity, reference deflection value, tracing direction, pick-feed value and pick-feed direction, as well as the tracing area, and trace the specified pattern on the basis of these data. FIGS. 1(A), 1(B) and 1(C) show examples of two-way scan tracing, one-way scan tracing and 360° contour tracing, respectively. The tracing pattern for two-way scan tracing is specified by a combination of approach motion S1, tracing motion S2 in one direction, pick-feed motion S3, tracing motion S4 in the return direction, and pick-feed motion S5. The tracing pattern for one-way scan tracing is specified by a combination of approach motion S1, tracing motion S2, rapid-return motion S3 along the +Z axis, return motion S4 in a direction opposite to tracing feed, rapid approach motion S5, and pick-feed motion S6. The tracing pattern for 360° contour tracing is specified by a combination of approach motion S1, contour tracing motion S2, and pick-feed motion S3.

Certain users have recently come to require tracer control based on patterns other than the tracing patterns (a) through (f) described above. For example, as shown in FIG. 2, there is a requirement for a tracer control method for repeating tracing in accordance with a rectangular tracing pattern comprising scan tracing motion along the +X axis, scan tracing motion S2 along the −Y axis, scan tracing motion S3 along the −X axis, and scan tracing motion S4 along the +Y axis. In cases such as the above-mentioned, the manufacturer is required on each occasion to redesign, or to modify the software of, the tracer apparatus so that tracer control conforming to the tracing pattern required by each user can be implemented. However, offering a tracer apparatus for each and every tracing pattern is a burden for the manufacturer. The user also is inconvenienced in that a single tracer apparatus cannot be made to perform tracing tailored to the user's own tracing patterns.

SUMMARY OF THE INVENTION

Accordingly, an object of the present invention is to provide a tracing method whereby tracing conforming to a user's wishes can be performed without modification of equipment and in a simple manner.

Another object of the present invention is to provide a tracer control method whereby various tracing patterns, in which at least data specifying tracing areas serve as variables, are registered or stored in memory beforehand, a predetermined tracing pattern is called while actual values are assigned to the variables, and tracer machining is performed in an area specified by an actual value on the basis of the pattern called.

Still another object of the present invention is to provide a tracer control method whereby a tracing pattern can be created at will and registered or stored in memory beforehand, which pattern can be called from memory to enable tracing based on the pattern.

The present invention provides a tracer control method whereby a plurality of tracing patterns, in which at least data specifying tracing areas serve as variables, are registered or stored in memory beforehand, a predetermined tracing pattern is called while actual values are assigned to the variables, and tracer machining is performed in a tracing area specified by an actual values on the basis of the tracing pattern called.

BRIEF DESCRIPTION OF THE DRAWINGS

FIG. 1, including

FIG. 5, including

DESCRIPTION OF THE PREFERRED EMBODIMENTS

Figure 1A:
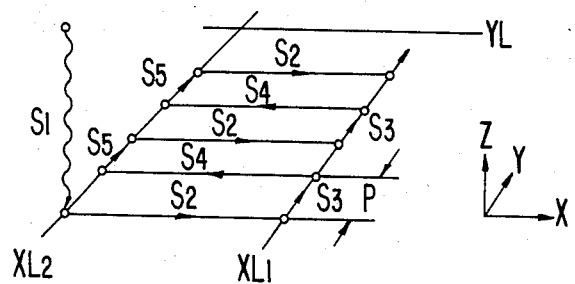
FIGS. 1(A)–1(C), are a tracing diagram for describing conventional tracing patterns.
Figure 1B:
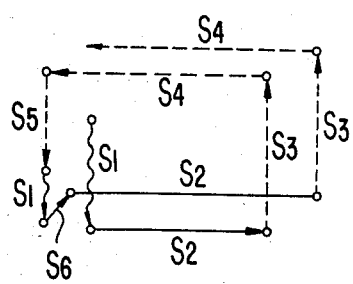
Figure 1C:
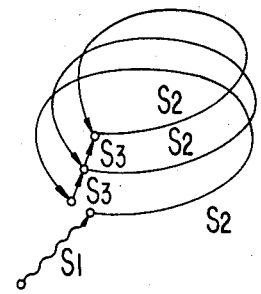
Figure 3:
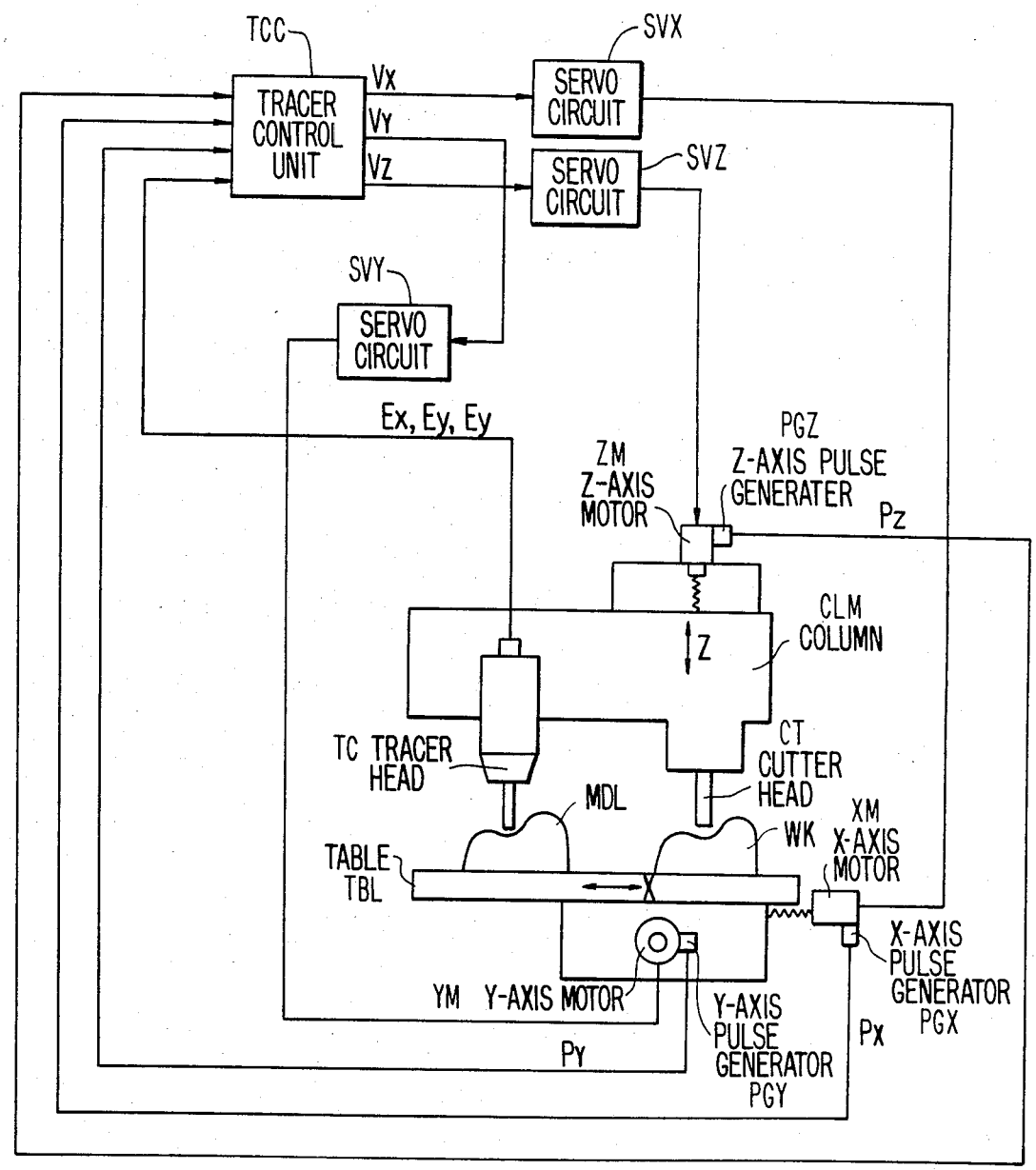
FIG. 3 is a simplified view of a tracing machine tool to which the present invention can be applied.

FIG. 3 is a simplified view of a tracing machine tool to which the present invention can be applied. The tracing machine tool is provided with an X-axis motor XM for driving a table TBL along the X axis, a Z-axis motor ZM for driving, along the Z axis, a column CLM mounting a tracer head TC and a cutter head CT, a Y-axis motor YM for moving the table TBL along the Y axis, a pulse generator PGX for generating a single pulse $P_x$ whenever the X-axis motor XM rotates by a predetermined amount, a pulse generator PGZ for generating a single pulse $P_z$ whenever the Z-axis motor ZM rotates by a predetermined amount, and a pulse generator PGY for generating a single pulse $P_y$ whenever the Y-axis motor YM rotates by a predetermined amount. Secured to the table TBL are a model MDL and a workpiece WK. The tracer head TC contacts and traces the surface of the model MDL, and the cutter head CT cuts the workpiece WK in accordance with the shape of the model. As known in the art, the tracer head TC is arranged to sense deflection $\epsilon_x$, $\epsilon_y$, $\epsilon_z$ along the respective X, Y and Z axes of the surface of model MDL, and the deflection along the various axes sensed by the tracer head TC is applied to a tracer control unit TCC, which performs known tracing calculations to generate velocity components along respective axes. For example, as a tracing method, let us consider the two-way scan tracing on the X-Z plane of FIG. 1(A). Two-way tracing is performed by generating velocity components $V_x$, $V_z$, and applying these to the X- and Z-axis motors MX, MZ via servo circuits SVX, SVZ, respectively, whereby the motors MX, MZ are driven into rotation. As a result, the cutter head CT is transported relative to the workpiece WK to cut the workpiece to the shape of the model MDL, and the tracer head TC traces the surface of the model.

Pulses $P_x$, $P_y$, $P_z$ generated by the respective pulse generators PGX, PGZ, PGY are applied to present or current position registers for the various axes, the registers, which are not shown, are incorporated within the tracer control unit TCC. Upon receiving the pulses $P_x$, $P_y$, $P_z$ as inputs thereto, each present position register has its status updated, that is counted up or counted down depending upon the direction of travel. When a present position $X_a$ along the X axis becomes equivalent to an X coordinate value $XL_1$ [FIG. 1(A)] of a first boundary point of a tracing area, the tracer control unit TCC takes the tracing plane as the Y-Z plane and generates velocity components $V_y$, $V_z$. The velocity component $V_y$ is applied to a servo circuit SVY, as a result of which the table TBL is moved along the Y axis to perform scan in the Y-Z plane. When the distance traveled by the table TBL along the Y axis becomes equivalent to a pick-feed value P [FIG. 1(A)], the tracer control unit TCC subsequently takes the tracing plane as the X-Z plane and generates velocity components $V_x$, $V_z$ to perform return tracing until the present position along the X axis comes into agreement with an X-axis coordinate value $XL_2$ of a second boundary point of a tracing area. Thereafter, pick-feed, scan tracing in one direction, pick-feed and scan tracing in the other direction are repeated to bring the present position along the Y axis to a boundary point $(Y_L)$ along the Y axis. With the arrival at the boundary point $(Y_L)$, two-way scan tracing ends.

According to the present invention, various basic path patterns for tracing, or path patterns comprising a combination of basic path patterns, are pre-registered in a memory as custom macros, or tracer head path patterns created by a predetermined program language are pre-registered in a memory as custom macros, a registered path pattern is called in response to simple tracer machining program data, and tracing is executed on the basis of this path pattern. In this case, machining condition data such as tracing area data, tracing velocity and pick feed are stored as variables and registered in a memory together with path patterns, and a prescribed path pattern is called from the memory while actual values are assigned to the variables. A custom macro is a subprogram or subroutine for specifying a tracing path pattern and is created by program commands in which variables can be used. A custom macro is called by a command in a main program such as a tracing machining program and the variables in the custom macro are set as the actual values specified in the main routine. Tracing machining is performed based on the custom macro called using the actual values.

Figure 4:
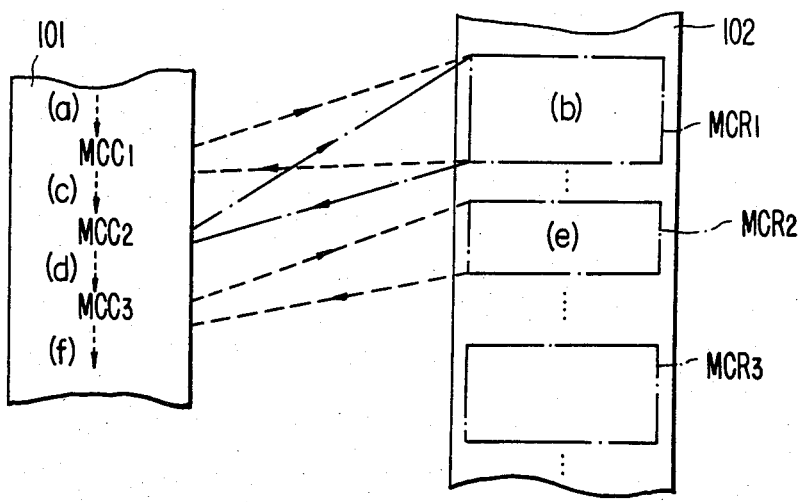
FIG. 4 is a diagram for describing the general features of the present invention.

FIGS. 4 and 5 are views for describing the general features of the present invention. In FIG. 4, numeral 101 denotes a memory which stores a tracing machining program, and numeral 102 denotes a path pattern memory in which there are registered named custom macros $MCR_1$, $MCR_2$ ... specifying various path patterns.

Figure 5A:
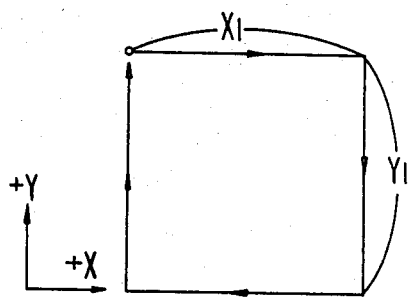
FIGS. 5(A)–5(H), are diagrams for describing pre-registered tracing patterns.
Figure 5B:
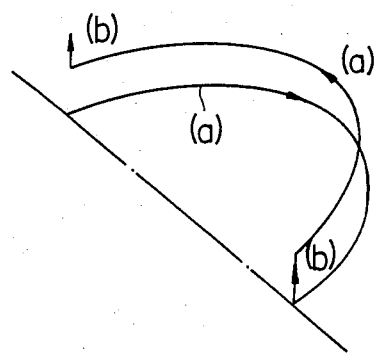
Figure 5C:
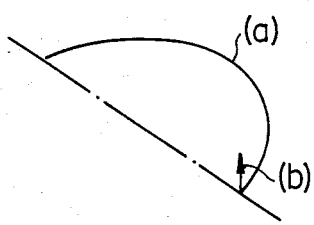
Figure 5D:
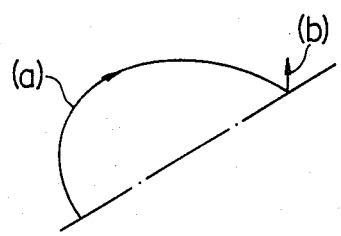
Figure 5E:
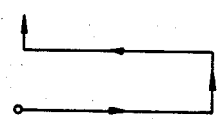
Figure 5F:
Figure 5G:
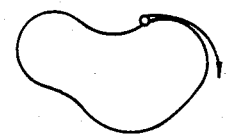
Figure 5H:
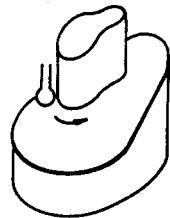

As examples of path patterns, FIG. 5(A) shows a rectangular scan tracing pattern, FIGS. 5(B) through (D) show tracing patterns in which contour tracing (a) and scan tracing (b) are linked, and FIG. 5(E) shows a two-way scan tracing pattern. In addition, tracing motion may be divided into the smallest basic motion units that are significant in terms of tracing machining, and the basic motion units may be stored as the path patterns. FIGS. 5(F) through (H) show examples of such patterns, in which (F) shows a scan tracing pattern for one direction with tracing direction and tracing area serving as variables, (G) shows a contour tracing pattern for a maximum of one revolution with tracing direction and tracing area serving as variables, and (H) shows a three-dimensional tracing pattern for a maximum of one revolution with tracing direction and tracing area serving as variables. It should be noted that the motion patterns shown in FIGS. 5(A) through (E) are created by combining basic motion patterns. If we assume that the tracing motion in one direction illustrated in FIG. 5(F) is expressed by a one-way tracing motion instruction H02, tracing direction data, tracing area data and tracing velocity, namely that the tracing motion in one direction illustrated in FIG. 5(F) is expressed by the following:

H02 [tracing direction data] [tracing area data] [tracing velocity data];

then the custom macro of the path pattern shown in FIG. 5(A) will be expressed by the following:

$$\left.\begin{array}{l} \text{O 9001} \\ \text{H 02} +X, X_1, F_1; \\ \text{H 02} -Y\ Y_1; \\ \text{H 02} -X\ X_1; \\ \text{H 02} +Y\ Y_1; \end{array}\right\} \quad (A)$$

This custom macro is stored in the path pattern memory 102. Note that 9001 is a path pattern number.

Inserted at suitable locations (three in the illustration) of the machining program stored in the memory 101 are macro call data $MCC_1$, $MCC_2$, $MCC_3$ for calling the path patterns (custom macros) stored in the path pattern memory 102. It is thus arranged so that a prescribed path pattern may be called from the memory 102. If the path pattern number 9001 [the number specifying the pattern of FIG. 5(A)] is to be called, then an item of macro call data would consist of a macro call command G65, the number P9001 of the path desired to be called, and an actual argument command for assigning actual values to the variables, the call data having the following configuration:

G 65 P9001 $X_1$=□...□, $Y_1$=□...□, $F_1$□...□ where $X_1$, $Y_1$, $Z_1$ denote variables used in custom macro (A) above. Actual values are assigned to the variables by $X_1$=□...□, $Y_1$=□...□, $F_1$=□...□, thereby completing the path pattern shown in custom macro (A) above. The program shown in FIG. 4 is executed in the sequence a, b, c, b, d, e, f.

Figure 2:
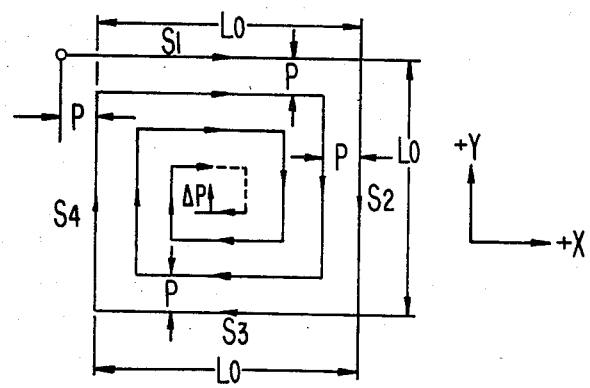
FIG. 2 is a tracing diagram for describing a tracing pattern not available in the prior art.
Figure 6:
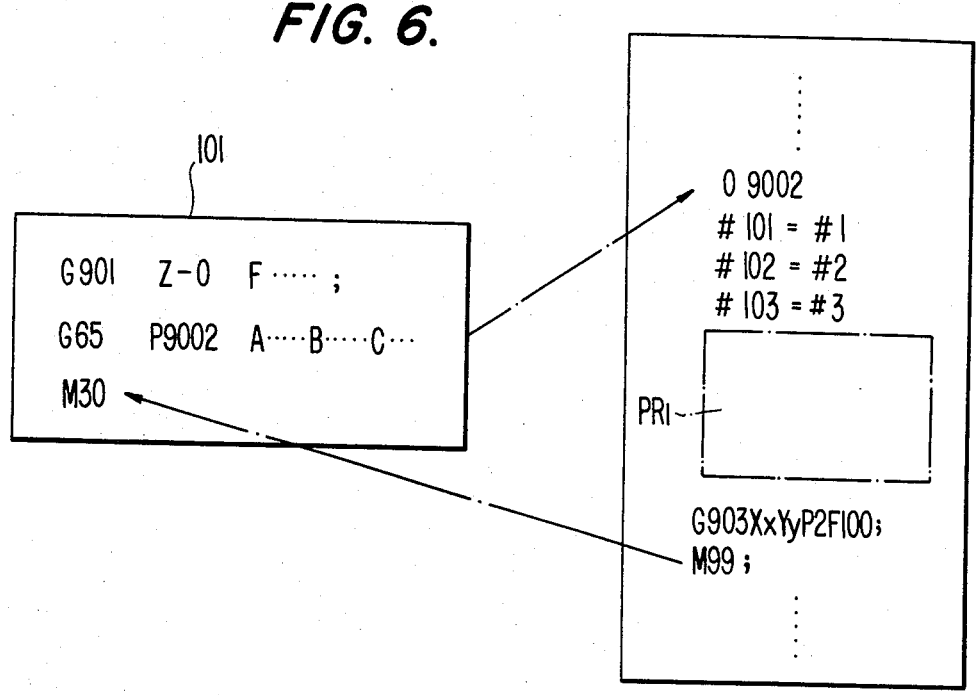
FIG. 6 is a diagram for describing tracing machining data as well as a custom macro specifying a tracing pattern.

FIG. 6 is a view for describing machining data and a custom macro in a case where tracing is performed along the path pattern shown in FIG. 2. The following tracing machining program data are stored in the memory 101:

G901 Z−0 F...;     (B)

G65 P9002 A ... B ... C ...;  (C)

M02;  (D)

where (B) is a block for an approach command, in which approach is indicated by the G-function instruction G901, approach along the Z axis is indicated by Z−0, the minus sign being the direction traveled for the approach. The approach velocity is indicated by a numerical value which follows the letter of the alphabet F. (C) is a command block for calling a path pattern, in which G65 is a macro call instruction, and the numerical value 9002 following the letter of the alphabet P is a path pattern number. The letters of the alphabet A, B, C are word address words for assigning actual values to the variables used in a custom macro for specifying a path pattern. The numerical values which follow the word address words A, B, C specify $L_o$, pitch P and minimum path length $\Delta P$ in one direction, respectively, these variables being indicated in FIG. 2. (D) is a command block indicating end of machining command data, in which M02 is an M-function instruction indicating program end. It should be noted that correspondence between word address words A, B, C ... of (C) and variables used in a custom macro are stored in memory beforehand. By way of example, the word address words A, B, C correspond to variable #1, #2, #3, respectively.

Stored in the path pattern memory 102 is the following custom macro instruction for specifying the path pattern shown in FIG. 2:

O 9000;  (E)
101 = #1;  (F)
102 = #2;  (G)
103 = #3;  (H)

⎫
⎬ PR1
⎭

G903 Xx Yy Q2 F100;  (I)
M99  (J)

Figure 7:
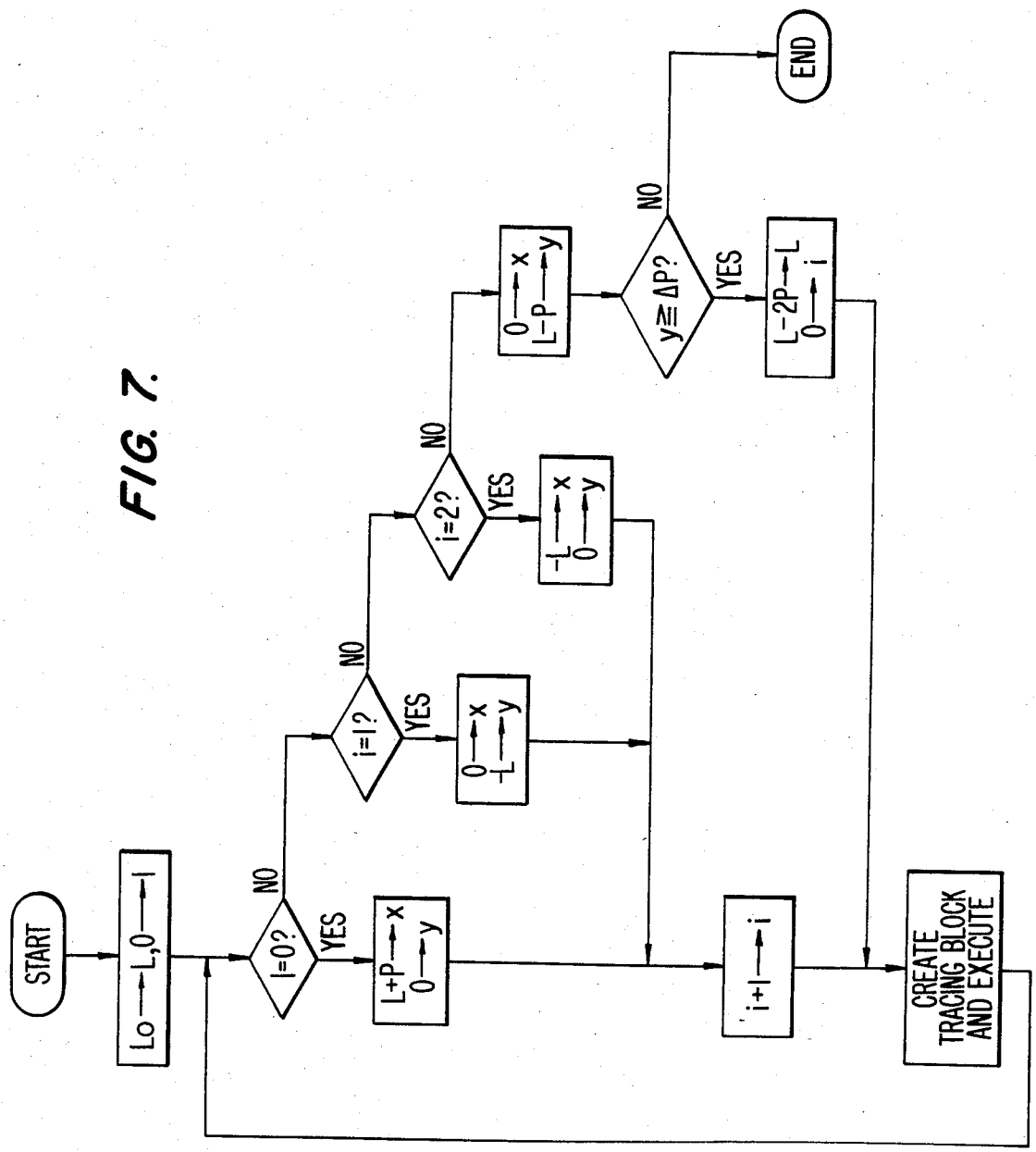
FIG. 7 is a flowchart illustrating a custom macro.

Note that (E) is a block specifying the name of the custom macro, in which the custom macro number is specified by the numerical value following the letter of the alphabet O. Further, (F), (G), (H) are blocks for storing $L_o$, P, $\Delta P$, which are specified by the word address words A, B, C in the custom macro call block contained in the tracer machining program, in registers corresponding to variables #101, #102, #103, respectively. (I) is a command block designating execution of one-way scan tracing, in which one-way scan tracing is indicated by G903, tracing direction and tracing area are designated by the numerical values and their signs following the letters of the alphabet X, Y, various machining conditions, which have been preset in another location of the memory, are selected by the numerical value following the letter of the alphabet Q, and tracing velocity is specified by the numerical value following the letter of the alphabet F. (J) is a block indicating the end of the custom macro, in which a custom macro end is commanded by M99. An instruction group PR1 between (H) and (I) is for moving the tracer head along the path pattern of FIG. 2, and is created using variables #101 (=$L_o$), #102 (=P), #103 (=$\Delta P$). A flowchart for the creation of the instruction group PR1 is illustrated in FIG. 7.

(a) First, the operations $L_o \rightarrow L$, $0 \rightarrow i$ are performed.

(b) Next, it is determined whether i is 0, 1, 2 or 3.

(c) If i=0 holds, this indicates scan tracing in the +X direction, and tracer head traveling distances x, y along the X and Y axes are calculated by performing the following operations:

$$L + P \rightarrow x$$

$$0 \rightarrow y$$

(d) This is followed by performing the following operation to increment i by one:

$$i + 1 \rightarrow i$$

(e) Thereafter, the tracer control unit TCC (FIG. 3) is supplied with the data (G903) indicative of the tracing method specified by block (I), the values of x and y obtained in step (c), tracing velocity (e.g., 100), and various tracing conditions corresponding to the machining condition data Q2. The tracer control unit TCC recognizes from G903 that the operation is one-way scan tracing, and analyzes x and y. Scan tracing along the +X direction in the X-Z plane is performed if x>0 and y>0 are true, scan tracing along the −Y direction in the Y-Z plane is performed if x=0 and y<0 are true, scan tracing along the −X direction in the X-Z plane is performed if x<0, y=0 are true, and scan tracing along the +Y direction in the Y-Z plane is performed if x=0 and y>0 are true. Scan tracing is ended if the traveling distance along the X axis or along the Y axis becomes |x| or |y|.

(g) When scan tracing in a predetermined direction ends, the decision step (b) is executed.

(h) If the decision rendered in step (b) is that i=1 is true, then this indicates scan tracing in the −Y direction. Therefore, the operations $0 \rightarrow x$, $-L \rightarrow y$ are performed, and processing is executed from step (d) onward.

(i) If the decision rendered in step (b) is that i=2 is true, then this indicates scan tracing in the −X direction. Therefore, the operations $-L \rightarrow x$, $0 \rightarrow y$ are performed, and processing is executed from step (d) onward.

(j) If the decision rendered in step (b) is that i=3 is true, then this indicates scan tracing in the +Y direction. Therefore, the following operations are performed:

$$0 \rightarrow x$$

$$L - P \rightarrow y$$

to calculate the traveling distances x, y of the tracer head along the X and Y axes, respectively.

(k) Next, y and $\Delta P$ are compared in magnitude. If $y < \Delta P$ is true, the final instruction M99 is read and tracing machining in accordance with the path shown in FIG. 2 is ended.

(m) If $y > \Delta P$ is true, on the other hand, then the following operations are performed:

$$L - 2P \rightarrow L$$

$$0 \rightarrow i$$

and processing is executed from step (d) onward.

By virtue of the foregoing steps (a) through (m), the tracer head is transported along the rectangular path pattern shown in FIG. 2.

Figure 8:
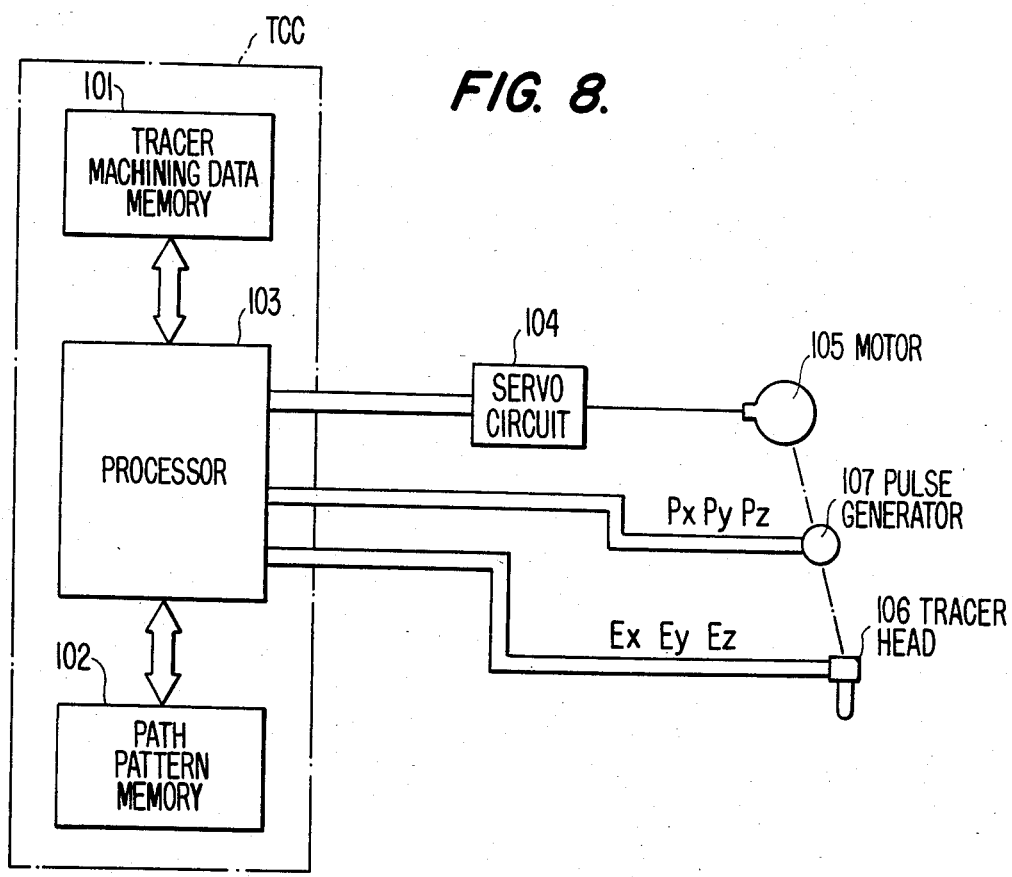
FIG. 8 is a simplified block diagram illustrating an embodiment of the present invention.

FIG. 8 is a block diagram illustrating the tracer apparatus TCC, in which numeral 101 denotes the memory storing tracer machining data, 102 the path pattern memory, 103 a processor, 104 servo circuitry for each axis, 105 a motor for each axis, 106 a tracer head, and 107 a pulse generator for each axis. When the apparatus is started, the processor 103 reads the tracer machining program data out of the memory 101 in sequential fashion and performs ordinary tracer control. When macro call data "65 . . . . . . . . ." is read out of the memory 101, the processor 103 goes to the the path pattern memory 102 to read out the path pattern (custom macro) having the macro number indicated by the call data. The processor 103 then executes tracer processing while inserting actual values into the variables of the custom macro. For example, if we assume that the path pattern (custom macro) read corresponds to the path shown in FIG. 5(A), then one-way tracing will take place initially in the X-Z plane. Therefore, feed velocity commands $V_x$, $V_z$ are applied to the servo circuit 104 to transport the table TBL and the column CLM (FIG. 2). As a result, the tracer head 106 is moved along the model, so that the tracer head produces axial deflections $\epsilon_x$, $\epsilon_y$, $\epsilon_z$, which enter the processor 103. The prossor 103 executes tracer computations based on the deflection to calculate new feed velocities $V_x$, $V_z$ in real time, these being delivered to the servo circuit 104. It should be noted that control is effected such that the feed velocity $V_x$ varies in inverse proportion to the value of $|\epsilon - \epsilon_o|$ (where $\epsilon$ is the resultant deflection and $\epsilon_o$ is the reference deflection), and such that the feed velocity $V_z$ varies in proportion to the value of $|\epsilon - \epsilon_o|$. The servo circuit 104 controls the table TBL and column CLM on the basis of $V_x$, $V_z$. Thus, machining proceeds by successively executing tracer computations based on the deflection of the tracer head 106, calculating velocity commands $V_x$, $V_z$ based on deflection along the model as sensed by the tracer head, and driving the motor for each axis to move the cutter head relative to the workpiece, whereby the workpiece is machined to a shape identical with that of the model. When the tracer head 106 travels a distance indicated by the area data $X_1$, tracing in the X-Z plane along the +X direction is ended, followed by execution of tracing in the Y-Z plane along the −Y direction. Thereafter, through processing similar to the above, tracing along the rectangular pattern of FIG. 5(A) is performed.

Figure 9:
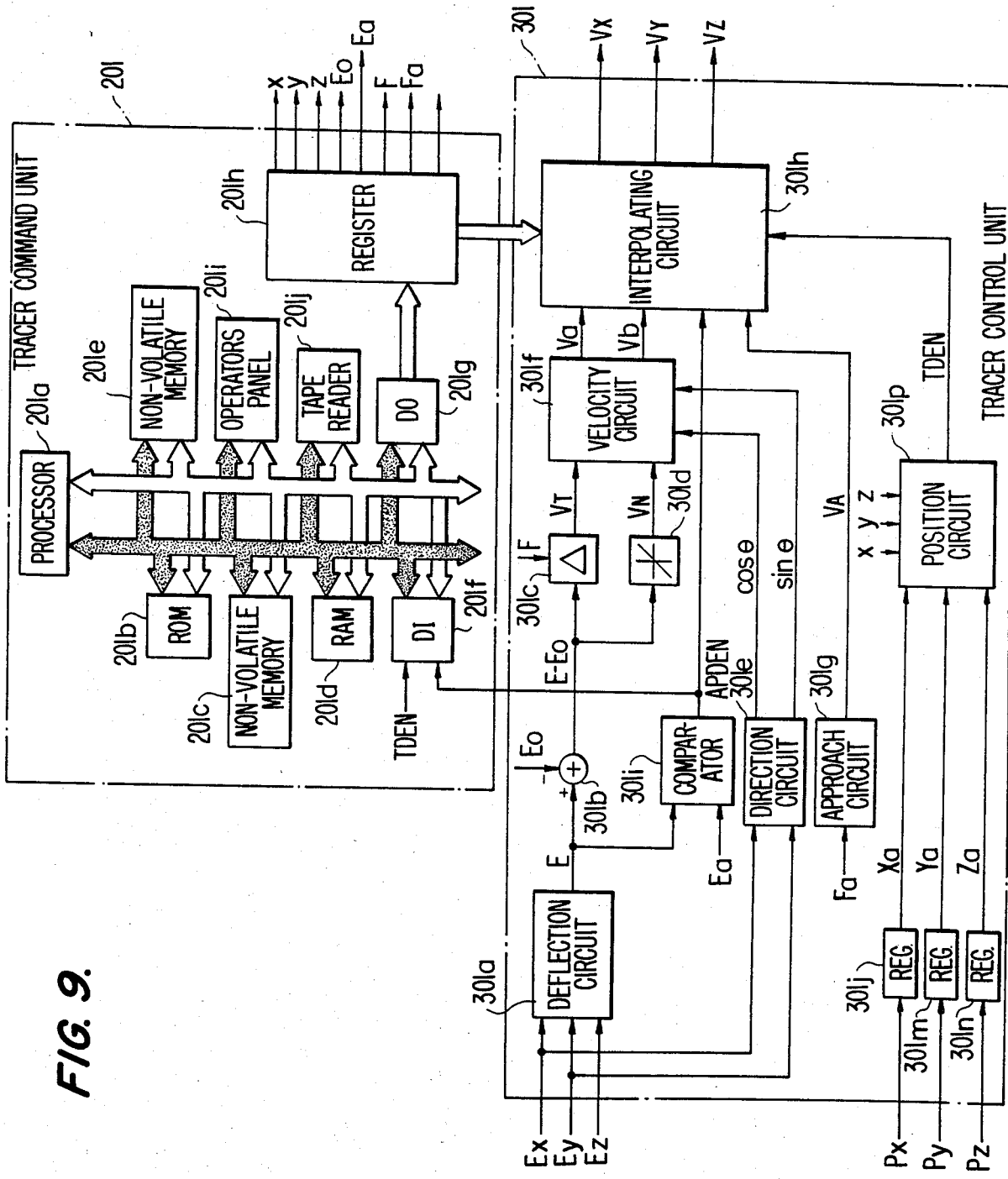
FIG. 9 is a block diagram illustrating another embodiment of the present invention.

FIG. 9 is a block diagram illustrating another embodiment of the present invention.

Numeral 201 denotes a tracer command unit constituted by a microcomputer and having a processor 201a, a ROM 201b storing a control program, a non-volatile memory 201e storing plural sets of machining conditions, a digital input (DI) unit 201f, a digital output (DO) unit 201g, an external output register 201h, an operator's panel 201i and an input unit such as a tape reader 201j. Stored beforehand in the non-volatile memory 201c are custom macros specifying a variety of path patterns. Tracing machining program from the operator's panel 201i or from the tape reader 201j are input to the RAM 201d in advance. Stored beforehand in the memory 201e are plural sets of machining condition data $Q_i (i=1, 2, ...)$, each set of machining conditions containing a reference deflection value $\epsilon_o$, a tracing plane, a tracing direction, a pick-feed direction, a pick-feed value and the like. The data $Q_i$ are stored with correspondence affixed thereto.

Numeral 301 denotes a tracer control unit which includes a deflection resultant circuit 301a, an adder 301b, velocity signal calculating circuits 301c, 301d, a direction deriving circuit 301e, a velocity calculating circuit 301f for velocity along each axis, an approach velocity generating circuit 301g, an interpolating circuit 301h, a comparator 301i, present position registers 301j, 301m, 301n for respective axes, and a position monitoring circuit 301p.

Using the axial deflections $\epsilon_x$, $\epsilon_y$, $\epsilon_y$ produced by the tracer head, the deflection resultant circuit 301a generates the resultant defection value $\epsilon$ by performing the operation indicated by the following equation:

$$\epsilon = \sqrt{\epsilon_x^2 + \epsilon_y^2 + \epsilon_z^2} \tag{1}$$

The adder 301b calculates the difference $(=\epsilon - \epsilon_o)$ between the resultant deflection value $\epsilon$ and the reference deflection value $\epsilon_o$, and applies the result to the velocity signal calculating circuits 301c, 301d. The velocity signal calculating circuit 301c produces a velocity signal $V_T$ having the commanded tracing velocity F when the difference $(\epsilon - \epsilon_o)$ is zero, and a velocity signal $V_T$ which is inversely proportional to the difference when $\epsilon - \epsilon_o \neq 0$ is true. The velocity signal calculating circuit 301d produces a velocity signal $V_N$ which is proportional to the difference $(\epsilon - \epsilon_o)$. The direction deriving circuit 301e uses the deflection signals $\epsilon_x$, $\epsilon_y$ along the X and Y axes to calculate deflection direction signals sin $\theta$, cos $\theta$ by performing the operations given by the following equations:

$$\epsilon_x / \sqrt{\epsilon_x^2 + \epsilon_y^2} = \sin\theta \tag{2}$$

$$\epsilon_y / \sqrt{\epsilon_x^2 + \epsilon_y^2} = \cos\theta \tag{3}$$

The velocity calculating circuit 301f uses the velocity signals $V_T$, $V_N$ and the deflection direction signals sin $\theta$, cos $\theta$ to generate velocity signals $V_a$, $V_b$ along the respective axes by performing the operations given by the following equations:

$$V_a = V_T \sin\theta + V_N \cos\theta \tag{4}$$

$$V_b = -V_T \cos\theta + V_N \sin\theta \tag{5}$$

The approach velocity signal generating circuit 301g generates an approach velocity signal $V_A$ conforming to a commanded approach velocity Fa. The interpolating circuit 301h interpolates $V_a$, $V_b$, $V_A$ along each axis based on the tracing method, tracing plane, tracing direction and pick-feed direction. For two-way scan tracing in the X-Z plane, (a) $V_a$ is delivered as the X-axis feed velocity $V_x$ and $V_b$ as the Z-axis feed velocity $V_z$ when tracing motion along one direction prevails, (b) $V_a$ is delivered as the Y-axis feed velocity $V_y$ and $V_b$ as the Z-axis feed velocity $V_z$ when pick-feed prevails, and (c) $-V_a$ is delivered as the X-axis feed velocity $V_x$ and $V_b$ as the Z-axis feed velocity $V_z$ when tracing motion in the return direction prevails. For contour tracing in the X-Y plane, the interpolating circuit 301h delivers $V_a$ as the X-axis feed velocity $V_x$ and $V_b$ as the Y-axis feed velocity $V_y$. Further, the interpolating circuit 301h delivers the approach velocity signal $V_A$ as the Z-axis feed velocity $V_z$ when approach is performed. The comparator 301i compares the resultant deflection value $\epsilon$ with a predetermined deflection value $\epsilon_a$ and produces an approach end signal APDEN as an output when $\epsilon \geq \epsilon_a$ is true. The present position registers 301j, 301m, 301n for respective axes record present positions $X_a$, $Y_a$, $Z_a$ along the respective axes by counting up or down, depending upon direction of rotation, pulses $P_x$, $P_y$, $P_z$ generated whenever motors for respective axes rotate by a predetermined amount. The position monitoring circuit 301p produces a motion end signal $T_{DEN}$ upon performing a monitoring operation to determine whether or not the tracer head has arrived at a boundary point of a tracing area when tracing motion is in effect, and whether or not the tracer head has traveled a pick-feed distance when a pick-feed is in effect. It should be noted that a sequence circuit incorporated within the interpolating circuit 301h counts the approach end signal APDEN and the motion end signal $T_{DEN}$ to interpolate $V_a$, $V_b$ along each axis on the basis of the counted values, tracing method, tracing plane, etc.

Figure 10:
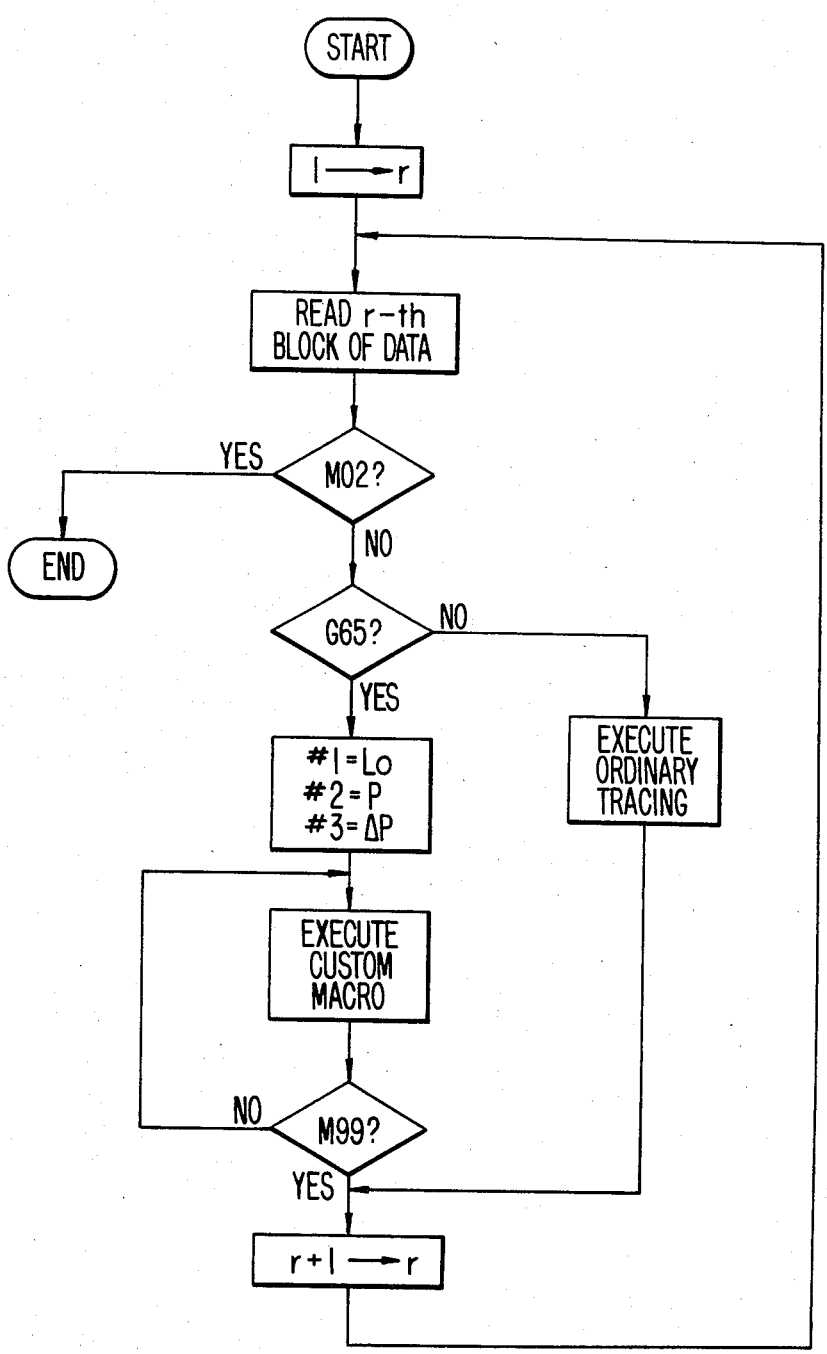
FIG. 10 is a flowchart of processing according to the present invention.

Next, the operation of FIG. 9 will be described for a case where tracer machining is performed in accordance with the tracing pattern shown in FIG. 2. FIG. 10 is a flowchart of the associated processing.

(A) When a start button (not shown) on the operator's panel is pressed, the processor 201a performs the operation 1→r and reads an r-th block of tracing machining program data out of the RAM 201d.

(B) Next, the processor determines whether the r-th block of tracing machining program data is M02; if it is, tracer processing is ended.

(C) If the r-th block of tracing machining program data is not M02, on the other hand, then it is determined whether the r-th block of tracing machining program data contains G65.

(D) If G65 is not contained in the data, ordinary tracer processing is performed. Specifically, the processor 201a delivers the tracing machining program data to the external output register 201h through the DO unit 201g. The data stored in the external output register 201h are applied to each location of the tracer control apparatus 301. Since the first block of tracing machining program data will be an approach command, the approach velocity signal generating circuit 301g produces the approach velocity signal $V_A$, which conforms to the numerical value following the letter of the alphabet F in the r-th (1st) block. Since the motion is approach motion (G903) and the approach direction is along the −Z axis, the interpolating circuit 301h produces −$V_A$ as the Z-axis feed velocity $V_z$. As a result, the tracer head approaches and contacts the model, whereupon the deflection resultant circuit 301a produces the resultant deflection $\epsilon$. The comparator 301i compares $\epsilon$ and $\epsilon_a$ and produces the approach end signal APDEN if $\epsilon \geq \epsilon_a$ is true. As a result, the interpolating circuit 301h performs the operation $V_z=0$, thereby stopping the tracer head.

The approach end signal APDEN is read by the processor 201a through the DI unit 201f.

(E) When the approach end signal APDEN is generated, the processor 201a performs the following operation:

r+1→r to increment r by one, reads the r-th block of tracing machining program data out of the RAM 201d, and performs processing from step (B) onward.

(F) If the decision rendered in step (C) is that the r-th block contains the custom macro call instruction G65, the the processor 201a assigns actual values to the variables, reads from the memory 201c the custom macro instruction group having the number following the letter of the alphabet P, and executes processing conforming to these instructions. Since the second block of tracing machining program data will contain the custom macro call instruction G65, the processor 201a inserts the numerical values $L_o$, P, $\Delta$P, which follow the letters of the alphabet A, B, C, into the RAM 204d at storage areas corresponding to the variables #1, #2, #3, respectively. The processor then sequentially reads the group of custom macro instructions having the number following the letter of the alphabet P and performs the process steps (a) through (m).

In step (e), each item of data is stored temporarily in the external output register 201h and is then applied to each section of the tracer control apparatus 301. In addition, various tracing conditions corresponding to the machining condition data $Q_i$ (i=1, 2, ...) are read out of the memory 201e and stored in the external output register 201h.

(G) When tracing based on the instructions of the custom macro is performed and the condition $y<\Delta P$ is established, an instruction M99 indicating custom macro end is read. Upon discriminating M99, the processor 201a performs the following operation:

r+1→r to increment r by one, reads the r-th block of tracing machining program data out of the RAM 201d, and executes processing from step (B) onward.

(H) If the decision rendered in step (B) is that the r-th block contains M02, the processor 201a regards this as indicating the end of tracer processing and produces a termination signal to complete tracer machining processing.

Thus, according to the present invention, a variety of path patterns are pre-registered in memory upon being converted into macro form. This makes it possible to execute tracing in accordance with complex paths merely by inserting macro call instructions in machining program at suitable locations, and inserting data which replaces the variables with actual values, or in other words, by means of a simple command. Furthermore, creation of machining command information is simplified because a registered macro can be called and used any number of times.

Further, according to the present invention, tracer control conforming to any tracing path can be performed in simple fashion by using a registered macro, thereby making it unnecessary to modify the apparatus and change the software design.

In the description given above, machining conditions are not dealt with as variables. However, it is possible to construct a custom macro in which tracing conditions such as tracing velocity and pick-feed value serve as variables.

The present invention makes it possible to perform tracing in accordance with an arbitrary tracing pattern without modifying equipment and without alteration of software. The invention is therefore well-suited for use in controlling a tracing machining tool.

We claim:

1. A tracer control method for performing tracing machining in accordance with a tracing machining program comprising a plurality of blocks, said method comprising the steps of:

preregistering, in a memory, a plurality of tracing path patterns in which at least data specifying tracing areas serve as variables;

inserting, in the tracing machining program, command data for calling one of the tracing path patterns and assigning actual values to variables which are used in the path pattern called;

reading out tracing machining program data block by block and performing tracing machining in accordance with the data;

calling a tracing path pattern specified by the command data and assigning actual values specified by the command data to variables used in the path pattern called when the command data for calling a tracing path pattern and assigning the actual values to the variables in the tracing path pattern is read; and performing tracing machining in a tracing area specified by the actual values, on the basis of the tracing path pattern called.

2. A tracer control method according to claim 1, wherein tracer head path data is created in a predetermined language using the variables and is registered in the memory as the tracing path pattern.

3. A tracer control method according to claim 1, wherein the tracing path pattern is a predetermined basic training motion pattern derived when a variety of tracing motions are divided into the smallest basic motions that are significant in terms of tracing machining.

4. A tracer control method according to claim 1, wherein the tracing path pattern is a pattern comprising a combination of basic motions derived when a variety of tracing motions are divided into the smallest basic motions that are significant in terms of tracing machining.

5. A tracer control method according to claim 1, wherein the tracing path pattern includes machining conditions expressed as variables.

* * * * *